US007640338B2

(12) United States Patent
Huitema et al.

(10) Patent No.: US 7,640,338 B2
(45) Date of Patent: Dec. 29, 2009

(54) SYSTEM AND METHOD FOR MITIGATION OF MALICIOUS NETWORK NODE ACTIVITY

(75) Inventors: Christian Huitema, Clyde Hill, WA (US); Sanjay N. Kaniyar, Redmond, WA (US); Nelamangal Krishnaswamy Srinivas, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 11/039,758

(22) Filed: Jan. 18, 2005

(65) Prior Publication Data

US 2006/0161980 A1    Jul. 20, 2006

(51) Int. Cl.
*G06F 15/173* (2006.01)
(52) U.S. Cl. .................. 709/224; 726/22
(58) Field of Classification Search .......... 709/224; 726/22
See application file for complete search history.

(56) References Cited

U.S. PATENT DOCUMENTS

| | | | |
|---|---|---|---|
| 6,823,387 B1 | 11/2004 | Srinivas | |
| 2001/0042200 A1 | 11/2001 | Lamberton et al. | |
| 2002/0055983 A1* | 5/2002 | Goddard | 709/217 |
| 2002/0166071 A1 | 11/2002 | Lingafelt et al. | |
| 2003/0135625 A1 | 7/2003 | Fontes et al. | |
| 2003/0200441 A1 | 10/2003 | Jeffries et al. | |
| 2004/0030424 A1* | 2/2004 | Corl et al. | 700/90 |
| 2004/0039938 A1 | 2/2004 | Katz et al. | |
| 2004/0111635 A1 | 6/2004 | Boivie et al. | |
| 2005/0229244 A1* | 10/2005 | Khare et al. | 726/13 |
| 2006/0072455 A1* | 4/2006 | Cai et al. | 370/230 |
| 2007/0044150 A1* | 2/2007 | Dalal et al. | 726/22 |

OTHER PUBLICATIONS

Anonymous, "CERT Advisory CA-1995-01 IP Spoofing Attacks and Hijacked Terminal Connections," <http://www.cert.org/advisories/CA-1995-01.html>, Jan. 12, 2005, pp. 1-10, Carnegie Mellon University (Sep. 1997).
Anonymous, "CERT Advisory CA-2001-09 Statistical Weaknesses in TCP/IP Initial Sequence Numbers,"< http://www.cert.org/advisories/CA-2001-09.htm>, Jan. 12, 2005, pp. 1-12, Carnegie Mellon University (2002).

(Continued)

*Primary Examiner*—Dustin Nguyen
*Assistant Examiner*—Michael E Keefer
(74) *Attorney, Agent, or Firm*—Wolf, Greenfield & Sacks, P.C.

(57) ABSTRACT

Malicious network node activity and, in particular, denial of service attacks, may be mitigated by one or more practical mitigation mechanisms and mitigation mechanism combinations. Suitable protocol messages may be challenged with a challenge probe. A response to the challenge probe may be utilized to determine if received protocol messages are illegitimate, that is, originated by a malicious network node. Received protocol messages may be classified as questionable protocol messages. For efficiency, protocol message challenges may be limited to protocol message classified as questionable. A sequence number limit may be calculated as a function of receive window size. Transmission control protocol messages may be determined to be illegitimate by comparing the acknowledgement number field with the calculated sequence number limit. Randomized selection of source port numbers for transmission control protocol connections may also mitigate malicious network node activity by resulting in legitimate protocol message field values that are less predictable.

11 Claims, 12 Drawing Sheets

OTHER PUBLICATIONS

Anonymous, "Cisco Security Advisory: Cisco Secure PIX Firewall TCP Reset Vulnerability," <http://www.cisco.com/warp/public/707/pixtcpreset-pub.shtml>, Jan. 12, 2005, pp. 1-6, Cisco Systems, Inc. (Jul. 2000).

Anonymous, "Shade Beta Group," <http://groups-beta.google.com/group/alt.2600/msg/ca88101916d2808e?as_umsgid=26OOhertz@shade.com&outpit=gplain>, Jan. 12, 2005, pp. 1-2 (Jan. 1995).

Bellovin, "Defending Against Sequence Number Attacks," AT & T Research Network Working Group Memo, pp. 1-6 (May 1996).

Convery et al., "BGP Vulnerability Testing: Separating Fact from FUD v1.00," NANOG 28, pp. 1-61, (Jun. 2003).

Dalal, "Transmission Control Protocol Security Considerations, draft-ietf-tcpm-tcsecure-01.txt," Network Working Group Memo, pp. 0-17, 2004 The Internet Society (Jun. 2, 2004).

Dalal, "Transmission Control Protocol Security Considerations, draft-ietf-tcpm-tcpsecure-02.txt," Network Working Group Memo, pp. 1-17, The Internet Society. (Nov. 22, 2004).

Ferguson et al., "Network Ingress Filtering: Defeating Denial of Service Attacks Which Employ IP Source Address Spoofing," Network Working Group Memo, , pp. 1-10, The Internet Society (May 2000).

Freier et al., "The SSL Protocol, Version 3.0, <draft-freier-ssl-version3-02.txt>" Transport Layer Security Working GroupMemo, pp. 1-63, Netscape Communications (Nov. 18, 1996).

Jacobson et al., "TCP Extensions for High Performance," Network Working Group Memo, pp. 1-37 (May 1992).

Kent et al., "Security Architecture for the Internet Protocol, draft-ietf-ipsec-rfc2401bis-04," Network Working Group Memo, , pp. 1-92, The Internet Society (Oct. 2004).

MacDonald et al., "Microsoft Windows 2000 TCP/IP Implementation Details White Paper," Supplement to Microsoft Windows 2000 TCP/IP Manuals, pp. i-130, Microsoft Corporation (Feb. 2000).

Postel for Internet Services Institute, "Internet Protocol: Darpa Internet Program Protocol Specification," RFC: 791 Defense Advanced Research Projects Agency, pp. i-45 (Sep. 1981).

Postel for Internet Services Institute, "Transmission Control Protocol: Darpa Internet Program Protocol Specification," RFC: 793 Defense Against Research Projects Agency, pp. i-85 (Sep. 1981).

Shimomura, "Internet Security: col. No. 001 Addendum," <http://www.networkcomputing.com/shared/printArticle.jhtml?article=/unixworld/security/001.add.htl&pub=nwc>, Jan. 12, 2005, pp. 1-7, University of California at San Diego (Jan. 1995).

Simpson, "PPP Challenge Handshake Authentication Protocol (CHAP)," Network Working Group Memo, pp. i-12, DayDreamer (Aug. 1996).

Stewart, "Transmission Control Protocol Security Considerations, draft-ietf-tcpm-tcpsecure-00.txt," Network Working Group Memo, pp. 0-10, The Internet Society (Apr. 19, 2004).

Watson, "Slipping in the Window: TCP Reset Attacks," Technical Whitepaper <www.terrorist.net>, pp. 1-34 (Oct. 30, 2003).

Watson, "Slipping in the Window: TCP Reset Attacks," PowerPoint slides <www.terrorist.net>, pp. 1-40, CanSecWest, Oct. 30, 2003.

Zalewski, "Strange Attractors and TCP/IP Sequence Number Analysis—One Year Later," http://Icamtuf.coredump.cx/newtcp/, Jan. 12, 2005, pp. 1-23.

* cited by examiner

SYSTEM AND METHOD FOR MITIGATION OF MALICIOUS NETWORK NODE ACTIVITY

FIELD OF THE INVENTION

This invention pertains generally to computer networks and, more particularly, to computer networks in which some network nodes may be malicious.

BACKGROUND OF THE INVENTION

The demand for digital communication services has resulted in unprecedented data network growth. Network growth has occurred both in terms of the number of nodes (i.e., the number of network-connected computing devices) as well as the amount of communications traffic between those nodes. This network growth has been supported by increased node computing power as well as the advent of broadband data transport hardware; an orders-of-magnitude quantitative change that has, in many respects, resulted in a new network environment.

At the same time, the standardized data communication protocols that launched the data network revolution have remained relatively static. For example, transmission control protocols in compliance with Postel, J., "Transmission Control Protocol—DARPA Internet Program Protocol Specification," RFC 793, USC/Information Sciences Institute, published September 1981, and internet protocols in compliance with Postel, J., "Internet Protocol," RFC 791, USC/Information Sciences Institute, published September 1981 (i.e., TCP/IP), are still involved in directing much of today's data network traffic. This gap between some of the communication protocols in use and other aspects of the modern network environment may be exploited by another modern network trend: an increasing number and variety of malicious network nodes.

New protocols such as secure sockets layer (SSL) and IP security protocol (IPsec) have been developed that are resistant to some forms of attack by malicious nodes. However, such new protocols are only of benefit when they are actually employed. The majority of network traffic is still sent "in the clear" using older network protocols and is still vulnerable to attack. A type of attack that is generally difficult for older protocols to defend against is a denial of service (DoS) attack and, more particularly, a denial of service attack that involves an attacker mimicking or "spoofing" protocol messages from legitimate network nodes.

Legitimate protocol messages have parameters with values in particular ranges. Although an attacker may have limited information with regard to valid parameter values for a particular connection, the attacker may raise their chance of mimicking a legitimate protocol message by sending large numbers of messages with varying parameter values. While this chance of mimicking may have been an acceptably remote possibility in the past, in the new network environment, the chance of successfully mimicking may rise to unacceptably high levels.

Beyond causing service degradation by simple flooding, attackers that successfully mimic legitimate protocol messages can interrupt an active connection, for example, by mimicking a legitimate connection reset message, and may even inject trojan data into an active transmission thus compromising its integrity and once again possibly resulting in a denial of service. There is a need to incorporate mitigation mechanisms for these types of denial of service attacks into older protocols. Minimizing the protocol impact of mitigation mechanisms is desirable because even small performance changes may be significant at the network level for a widely used protocol. For example, an increase in protocol message size may result in a loss of scalability. In addition, mitigation mechanisms should be tolerant of the imperfections of practical network environments such as unpredictable node and connection failures as well as network nodes running protocol stacks that do not entirely comply with protocol standards.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, malicious network node activity is mitigated by computer-executable instructions stored on a computer-readable medium. It may be determined that a received protocol message is a questionable protocol message. A challenge probe may be sent and a response to the challenge probe received. It may be determined that the protocol message is an illegitimate protocol message (e.g., a protocol message originated by a malicious network node). The illegitimacy determination may be a function of one or more of the response field values, for example, a message type field value.

In an embodiment of the invention, malicious network node activity is mitigated independent of challenge probes. A received transmission control protocol (TCP) message may include a sequence number field and an acknowledgement number field. A sequence number limit may be calculated as a function of a receive window size. It may be determined that the protocol message is an illegitimate protocol message by comparing the acknowledgement number field of the protocol message and the sequence number limit. The protocol message may be a bad message (i.e., an illegitimate message) if its acknowledgement number field value is less than the calculated sequence number limit.

In an embodiment of the invention, malicious network node activity is mitigated with judicious selection of TCP source port numbers. A valid range of TCP source port numbers may be determined and a source port number randomly selected from the valid range of source port numbers. A TCP synchronize (SYN) message may be instantiated and a source port field value of the SYN message set to the selected source port number.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
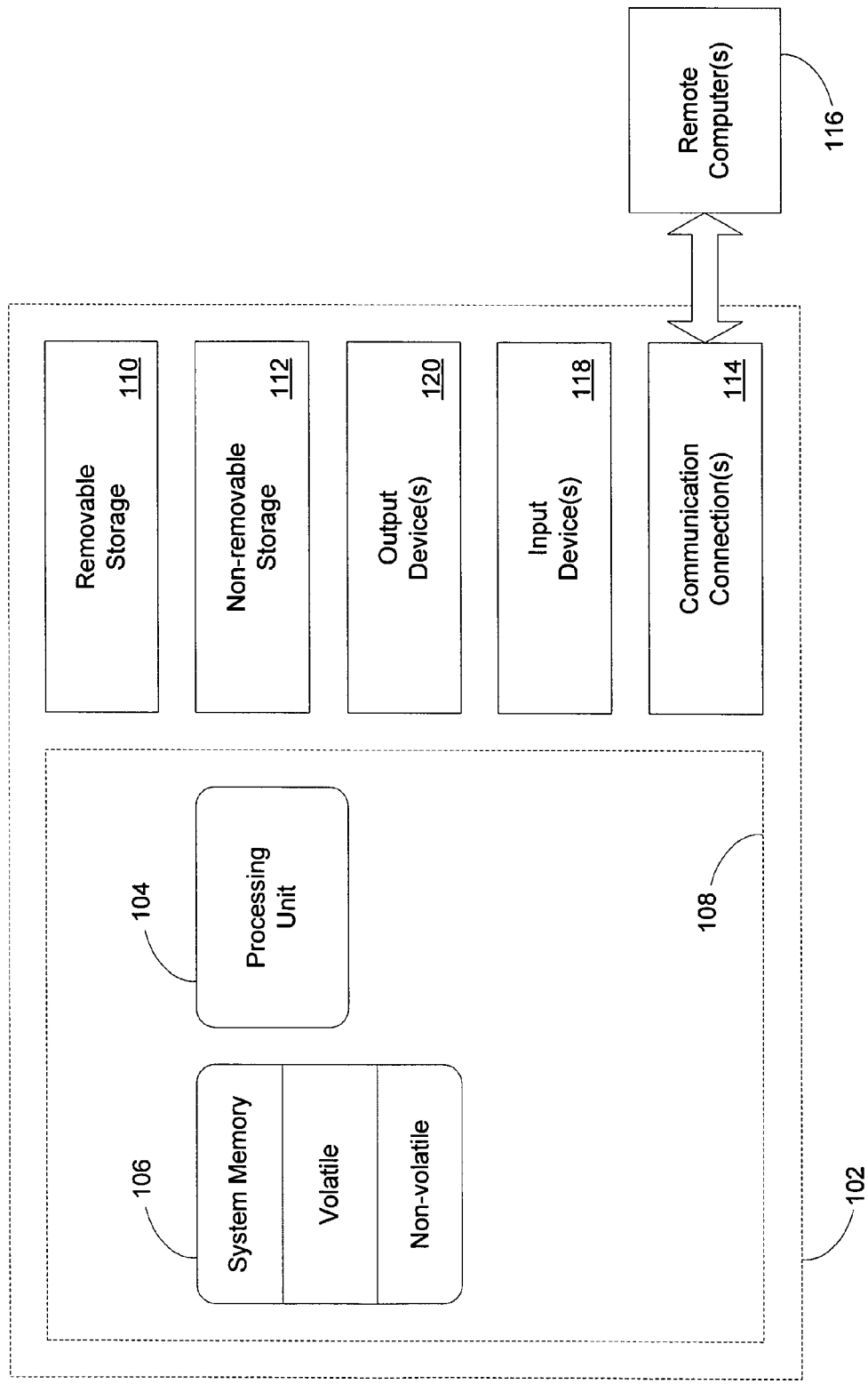
FIG. 1 is a schematic diagram generally illustrating an exemplary computer system usable to implement an embodiment of the invention.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 1 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

Figure 2:
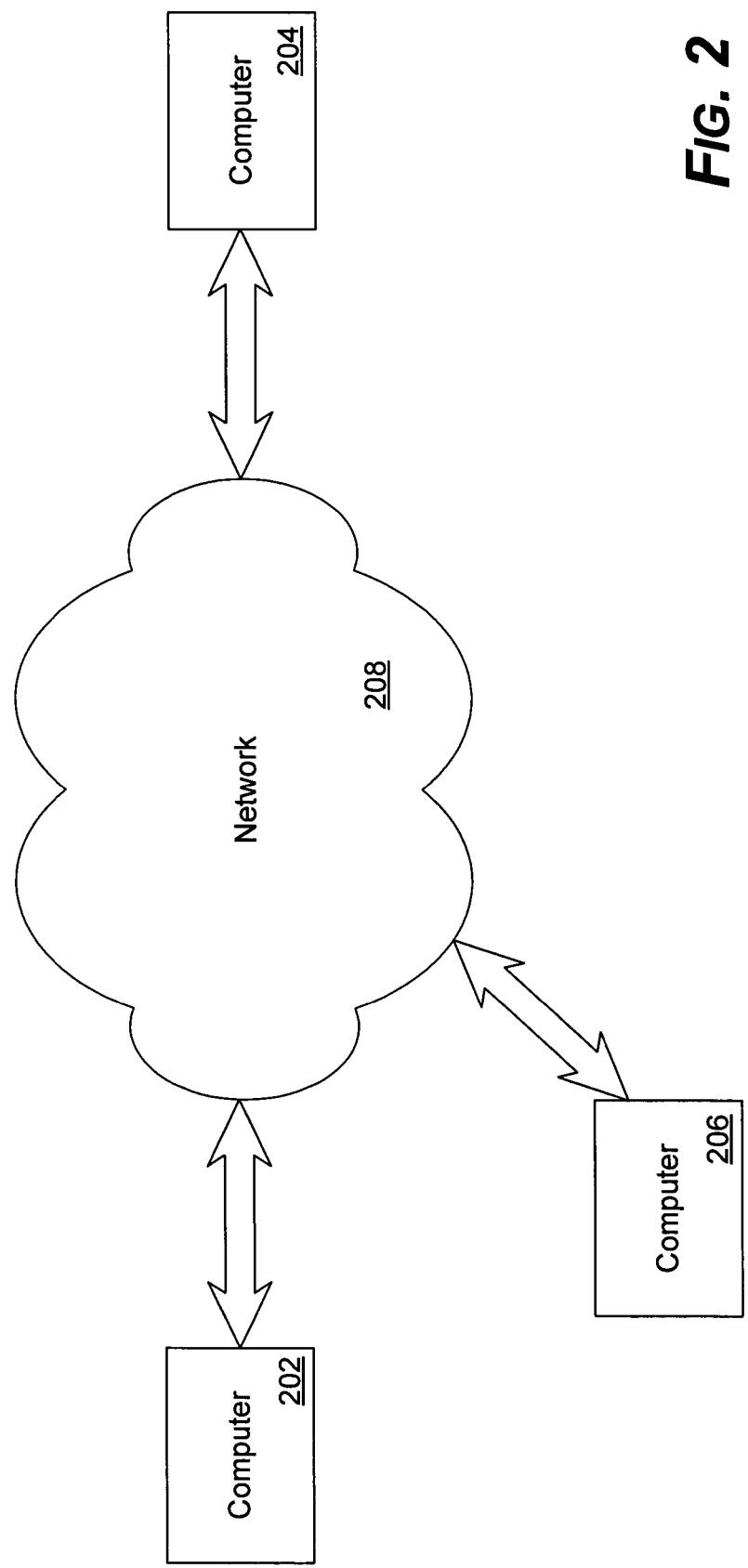
FIG. 2 is a schematic diagram illustrating computers connected by a network.

An example of a computer networking environment suitable for incorporating aspects of the invention is described with reference to FIG. 2. The example computer networking environment includes several computers 202, 204 and 206 communicating with one another over a network 208, represented by a cloud. Network 208 may include many well-known components, such as routers, gateways, hubs, etc. and allows the computers 202, 204 and 206 to communicate via wired and/or wireless media. When interacting with one another over the network 208, one or more of the computers 202, 204 and 206 may act as clients, servers or peers with respect to other computers 202, 204 and 206. Accordingly, the various embodiments of the invention may be practiced on clients, servers, peers or combinations thereof, even though specific examples contained herein may not refer to all of these types of computers.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

For clarity in what follows, the description will focus on mitigation of attacks against a transmission control protocol (TCP) in at least partial compliance with RFC 793, however it will be apparent to one of skill in the art that the techniques and mechanisms described may be utilized to mitigate attacks against any suitable communication protocol. First, architectural context is provided and relevant details are highlighted.

Figure 3:
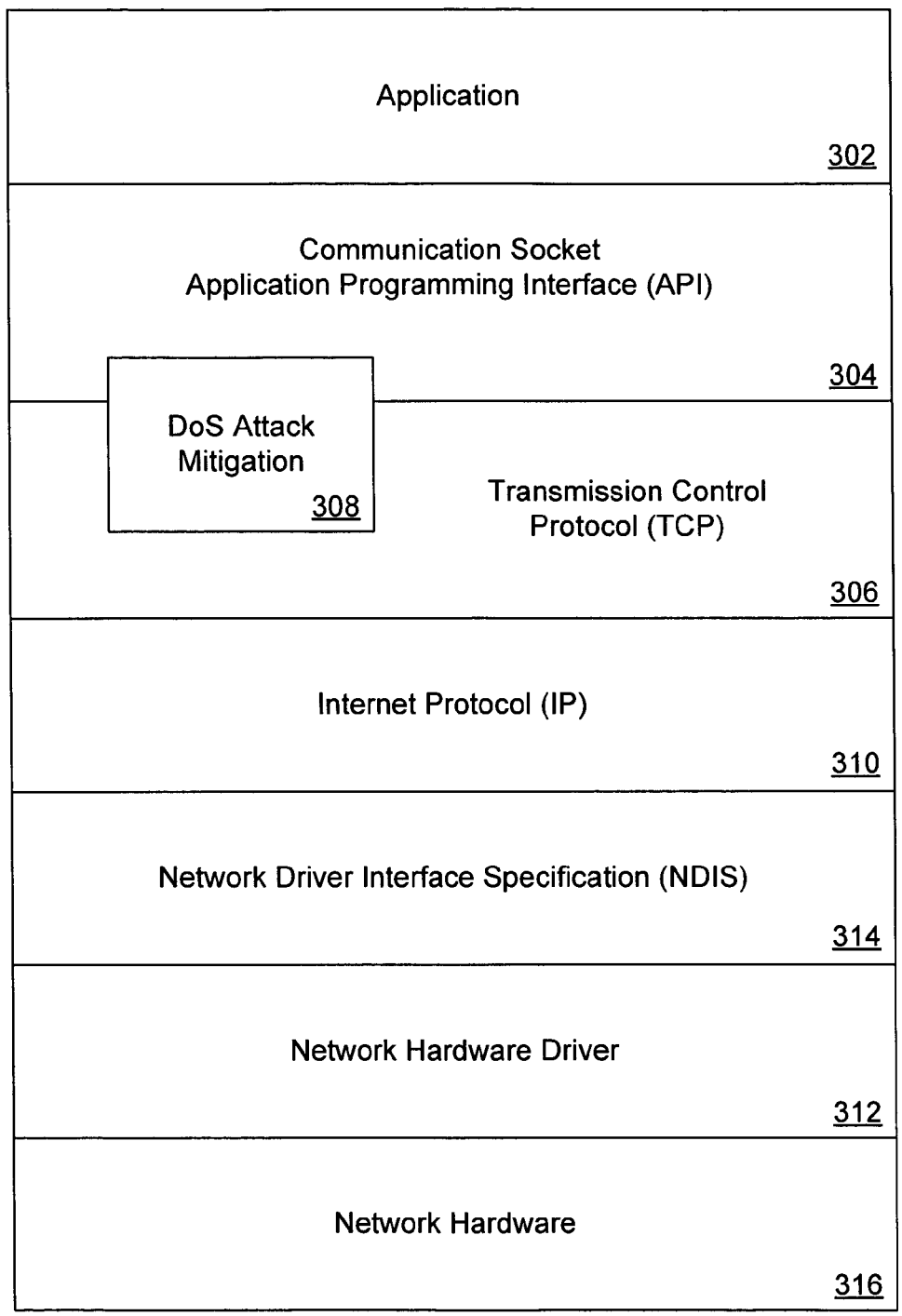
FIG. 3 is a schematic diagram depicting an example high level architecture in accordance with an embodiment of the invention.

FIG. 3 depicts an example high level architecture 300 in accordance with an embodiment of the invention. A network-connected application 302 (e.g., a hypertext browser) may interact with the network 208 (FIG. 2) through a communication socket application programming interface (API) 304 such as a Microsoft® Windows® Sockets (Winsock) application programming interface. In turn, the communication socket API 304 may interact with a transmission control protocol (TCP) layer 306. A denial of service (DoS) attack mitigation module 308 may provide services to both the communication socket API 304 and the TCP layer 306 as described in detail below.

In a manner well known in the art, the TCP layer 306 may pass TCP data packets to an internet protocol (IP) layer 310. The IP layer 310 may add to the TCP data packet so that it becomes a TCP/IP data packet. The TCP/IP data packet may then be passed to a network hardware driver 312 with another API such as a network driver interface specification (NDIS) 314 and, ultimately, onto network hardware 316 such as a network interface card (NIC) and the network 208 (FIG. 2). Each of the computers 202, 204 and 206 may include the components 302, 304, 306, 308, 310, 312, 314, 316 of the architecture 300.

Figure 4:
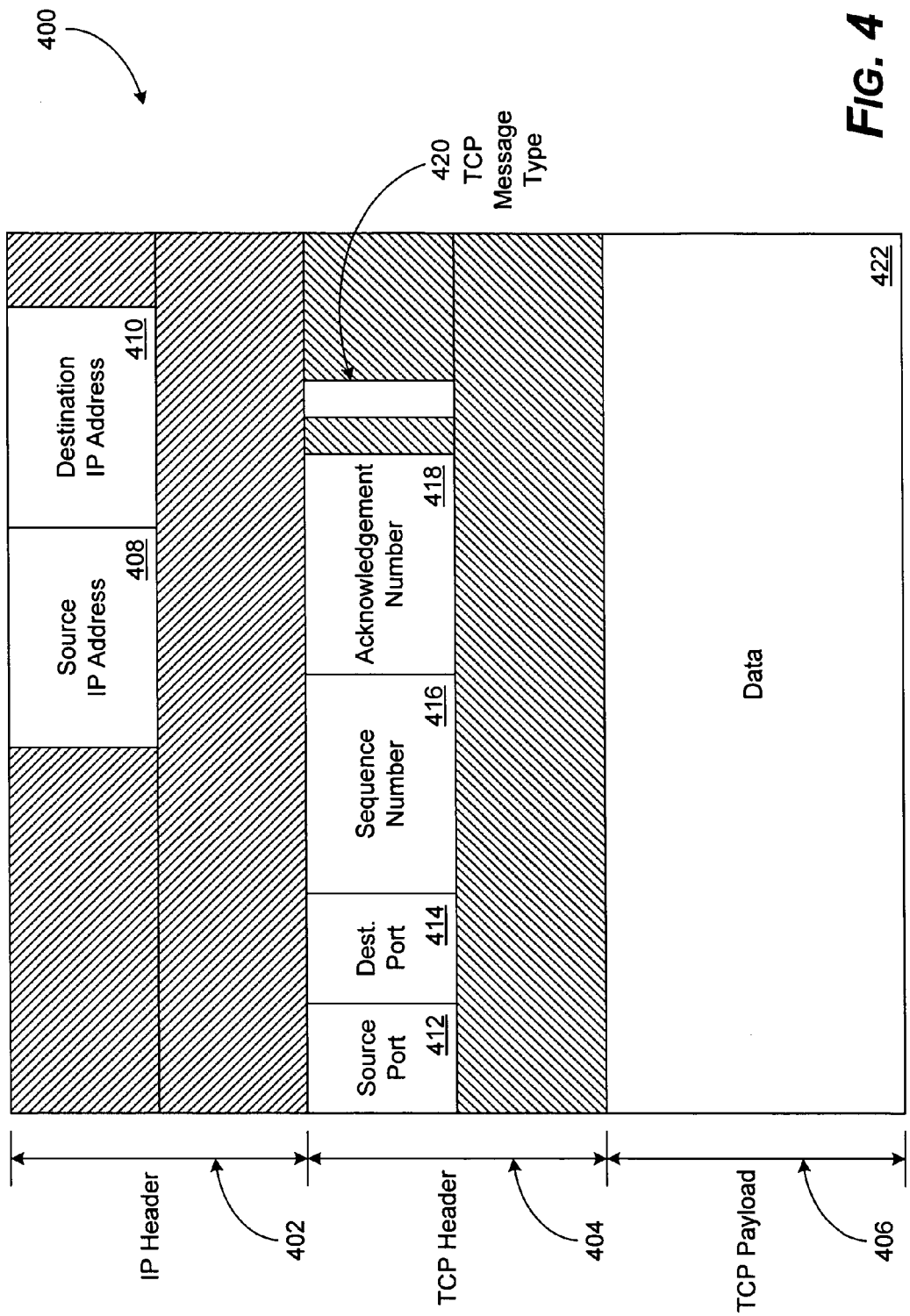
FIG. 4 is a schematic diagram highlighting aspects of a TCP/IP data packet in accordance with an embodiment of the invention.

It will be helpful to highlight aspects of the TCP/IP data packet. FIG. 4 shows a schematic diagram of a TCP/IP data packet 400. For the purposes of this description the TCP/IP data packet 400 may be divided into three main sections: an IP header 402, a TCP header 404 and a payload 406. The IP header 402 includes a source IP address 408 and a destination IP address 410. The shaded portion of the IP header 402 includes additional IP header fields. The IP header fields may be formatted and have functions in compliance with RFC 791. For example, each of the IP addresses 408 and 410 may be 32-bit fields.

The TCP header 404 includes a source port number 412, a destination port number 414, a sequence number 416, an acknowledgement number 418 and a TCP message type 420. The shaded portion of the TCP header 404 may include additional TCP header fields. The TCP header fields may be formatted and have functions in compliance with RFC 793. For example, each of the port numbers 412 and 414 may be 16-bit numbers, each of the sequence numbers 416 and 418 may be 32-bit numbers and the TCP message type 420 may be a set of TCP message type flags including ACK, RST, SYN and FIN flags. The value of the TCP message type flags may determine the type(s) of the TCP message carried by the data packet 400. For example, the TCP message may be an acknowledgement message if the ACK flag is set, a reset message if the RST flag is set, a synchronize message if the SYN flag is set, and so on. Combinations of flags may be set in accordance with RFC 793. For the purposes of this description, the payload 406 may be considered to be a single opaque data field 422. Each data field of the data packet 400 may have one or more values.

Figure 5:
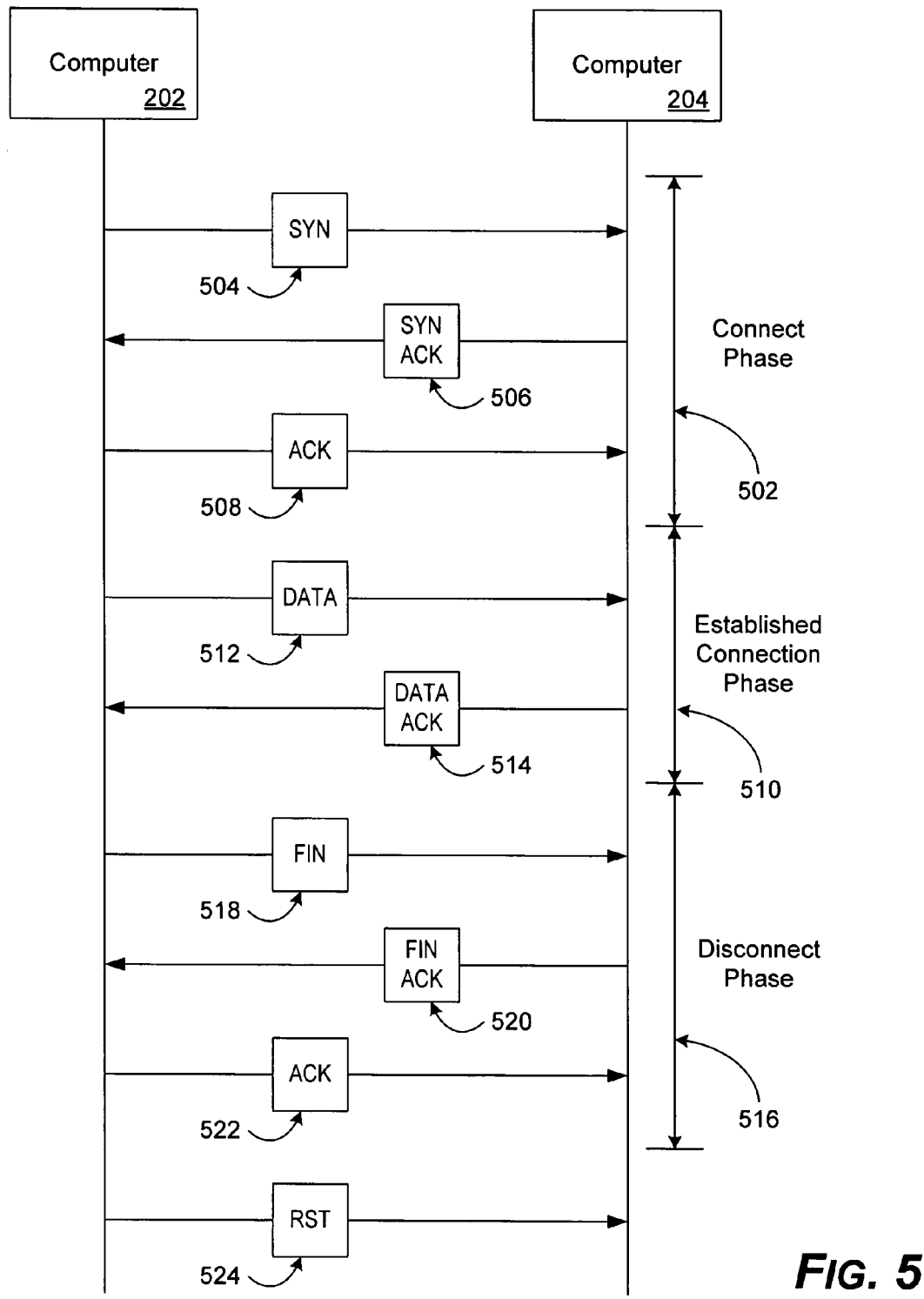
FIG. 5 is a protocol diagram depicting example transmission control protocol (TCP) exchanges in accordance with an embodiment of the invention.

Communication connections 114 (FIG. 1) between computers (e.g., computers 202 and 204 of FIG. 2) may be implemented, at least in part, by exchanging TCP/IP data packets such as the data packet 400. In order to provide for reliable data delivery over potentially unreliable transmission media, TCP includes a number of protocol phases including a connect phase, an established connection phase and a disconnect phase. FIG. 5 depicts example TCP exchanges between the computers 202 and 204 during each phase.

During a connect phase 502, the computer 202 may indicate a desire to establish a communication connection with the computer 204 by sending a SYN message 504 to the computer 204. If the computer 204 is accepting new connections, it may reply to the computer 202 with a SYN ACK message 506. An ACK message 508 from the computer 202 to the computer 204 may complete the connect phase 502 and transition the protocol to an established connection phase 510.

In the established connection phase 510, the computer 202 may send data packets such as DATA packet 512 to the computer 204. Each sent data packet may be acknowledged by an acknowledgement message, for example, the DATA packet 512 is acknowledged by the DATA ACK message 514. Each of the DATA packet 512 and the DATA ACK message 514 may have the ACK flag of the TCP message type 420 (FIG. 4) set in accordance with RFC 793. The DATA packet 512 and the DATA ACK message 514 are labeled differently in FIG. 5 to emphasize that the DATA packet 514 is acknowledging the DATA packet 512. The established connection is full duplex. As a result, the computer 204 may also send data packets to the computer 202 and receive corresponding acknowledgement messages in return, although this is not shown explicitly in FIG. 5.

The established communication connection utilizes resources at each participating computer 202 and 204. When the communication connection is no longer required, the resources are freed by ending the connection. The protocol may transition to a disconnect phase 516 by sending a FIN message 518. FIG. 5 shows the FIN message 518 being sent from the computer 202 to the computer 204, but the FIN message may be sent by the computer 204 to the computer 202. In reply to the FIN message 519, the computer 204 may send a FIN ACK message 520 to the computer 202 and then an ACK message 522 from the computer 202 to the computer 204 terminates the connection, ending the disconnect phase 516. Again, each of the FIN message 518 and the FIN ACK message 520 may have the ACK flag of the TCP message type 420 (FIG. 4) set in accordance with RFC 793. The FIN message 518 and the FIN ACK message 520 are labeled differently in FIG. 5 to emphasize that the FIN ACK message 520 is acknowledging the FIN message 518.

The exchange of the disconnect phase 516 is known as a graceful connection termination because the state of the communication connection at each computer 202 and 204 may be well-determined during each step of the exchange. Abortive connection terminations are also possible. If the computer 202 sends a RST message 524 to the computer 204, the message is an indication to the computer 204 that the computer 202 considers the communication connection terminated and has freed the resources associated with the connection. If the computer 204 does not receive the RST message 524 then the computer 204 may consider the communication connection active even though the computer 202 does not. Although not shown in FIG. 5, the computer 204 may also unilaterally terminate the communication connection by sending a RST message to computer 202.

Many data packets such as the data packet 400 (FIG. 4) may arrive at the computer 204. If the destination IP address 410 of the data packet 400 matches the IP address of the computer 204, the data packet 400 may be delivered to the IP layer 310 (FIG. 3) component of the computer 204. At the TCP layer 306, a particular communication connection may be identified by a tuple including the source IP address 408, the destination IP address 410, the source port number 412 and the destination port number 414. A condition of a particular data packet 400 being associated with a particular communication connection by the TCP layer 306 may include that the fields of the data packet 400 match the tuple identifying the communication connection. In addition, the communication connection may be in one of a number of states requiring that further of the fields of the data packet 400 (e.g., the sequence number 416, the acknowledgement number 418 and/or the TCP message type 420) have values within certain ranges, for example, as specified by RFC 793, in order for the data packet 400 to be accepted by the communication connection.

Malicious nodes attempting to mimic legitimate TCP/IP messages may attempt to fill the fields of the data packet 400 (FIG. 4) with values corresponding to an existing communication connection. If successful, the data packet 400 from the malicious node may be accepted by a legitimate party to the communication connection, possibly resulting in a denial of service or other undesirable consequence. Mitigation (e.g., lowering the probability) of this scenario may include modification and/or extension of the communication connection protocol(s), for example, modification of TCP.

Figure 6:
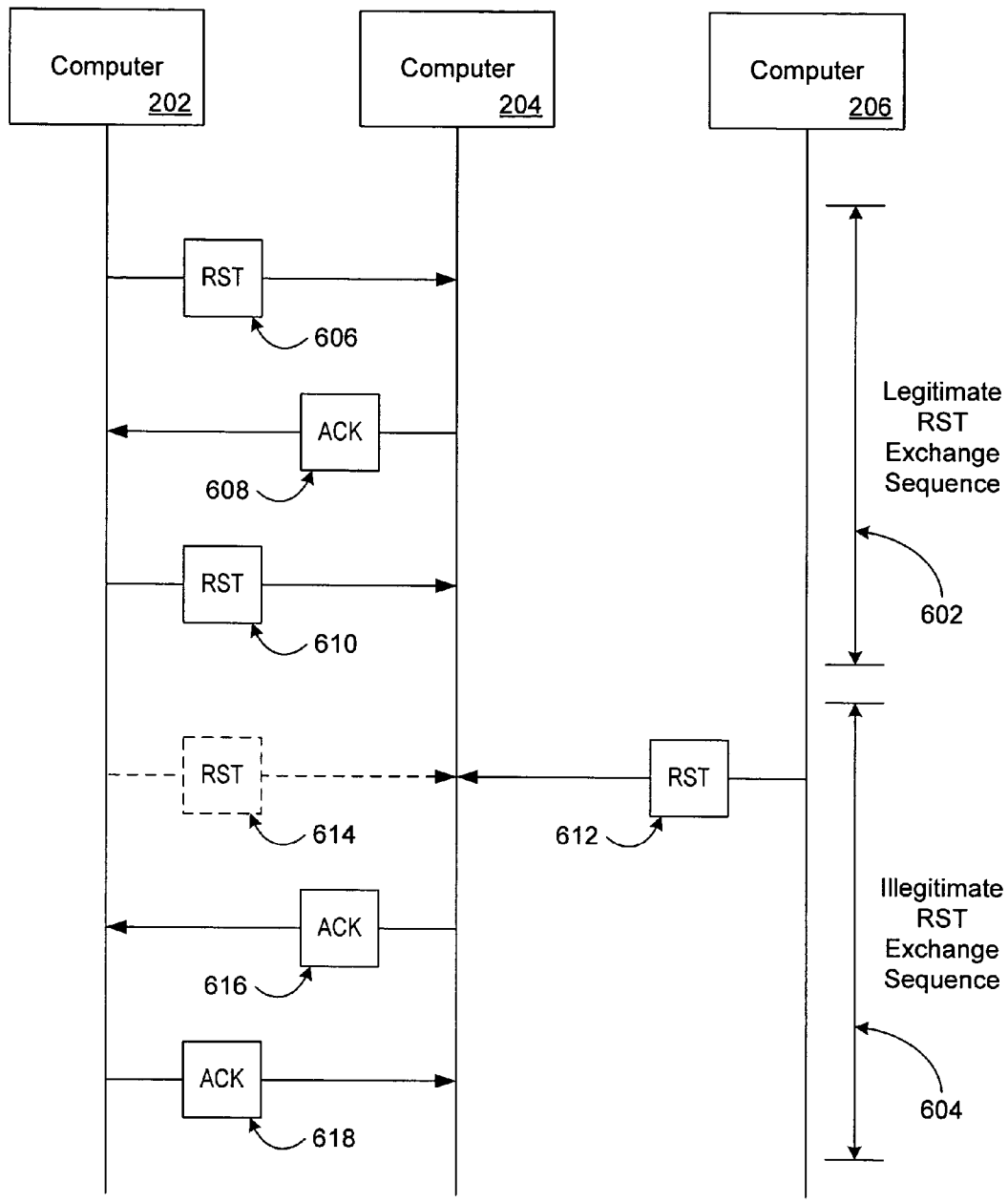
FIG. 6 is a protocol diagram depicting example modified TCP exchanges incorporating challenge probes to distinguish between legitimate and illegitimate RST messages in accordance with an embodiment of the invention.

In an embodiment of the invention, mitigation of malicious network node activity and, in particular, denial of service attack mitigation is achieved by incorporating a challenge probe into the communication connection protocol(s). FIG. 6 depicts an example of a modified TCP incorporating a challenge probe to distinguish between legitimate and illegitimate RST messages. An example legitimate RST exchange sequence 602 is contrasted with an example illegitimate RST exchange sequence 604.

An established TCP connection may exist between the computer 202 and the computer 204. The legitimate RST exchange sequence 602 may be initiated with a legitimate RST message 606 from the computer 202 to the computer 204 informing the computer 204 that the computer 202 considers the TCP connection terminated. In response to the RST message 606, the computer 204 may send a challenge probe 608 to the computer 202 to confirm the legitimacy of the RST message 606. As shown in FIG. 6, suitable conventional TCP messages that may be utilized as the challenge probe 608 include the ACK message. Choice of the ACK message for utilization as the challenge probe 608 may minimize the impact of TCP modifications. The computer 202 may receive the challenge probe 608, however, the computer 202 considers the TCP connection terminated. In compliance with RFC 793, the computer 202 may send a second RST message 610 to the computer 204 in response to the challenge probe 608. Receipt of the second RST message 610 at the computer 204 may be considered confirmation that the RST message 606 was legitimate.

In contrast, the illegitimate RST exchange sequence 604 may be initiated with an illegitimate RST message 612 from the computer 206 to the computer 204. In this example, the computer 206 is a malicious node attempting a denial of service attack on computer 204. Although the RST message 612 is sent from the computer 206, the field values of the RST message 612 are set so that the RST message 612 appears to the computer 204 to be a legitimate message 614 originating from the computer 202.

As in the legitimate RST exchange sequence 602, the computer 204 may respond to the incoming RST message 612 by sending a challenge probe 616 to the apparent source of the RST message 612 which is, in this case, the computer 202. Once again, as shown in FIG. 6, suitable conventional TCP messages that may be utilized as the challenge probe 616 may include the ACK message. In the illegitimate RST exchange sequence 604, however, the computer 202 did not originate the RST message 612 and may consider that the established TCP connection between the computer 202 and the computer 204 remains in existence. As a result, and once again in compliance with RFC 793, the computer 202 may respond to the challenge probe 616 with an ACK message 618. Receipt of the ACK message 618 in response to the challenge probe 616 may be considered an indication that the RST message 612 was illegitimate.

Figure 7:
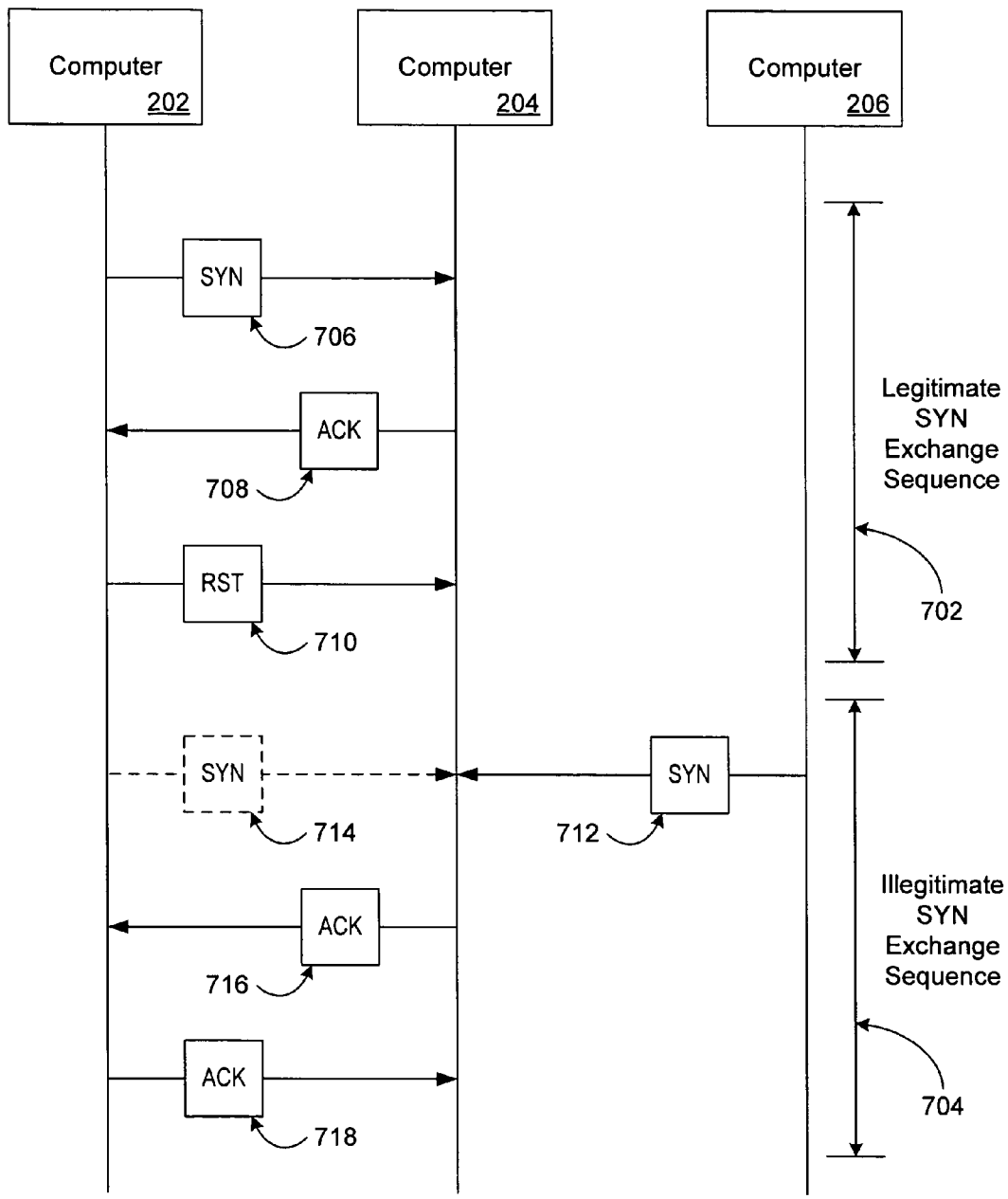
FIG. 7 is a protocol diagram depicting example modified TCP exchanges incorporating challenge probes to distinguish between legitimate and illegitimate SYN messages in accordance with an embodiment of the invention.

The ability to distinguish between legitimate and illegitimate protocol messages may enable the node under attack to mitigate the attack, for example, by dropping or ignoring illegitimate protocol messages. The effectiveness of the challenge probe to distinguish between legitimate and illegitimate protocol messages is not limited to the RST message. FIG. 7 depicts a further example of a modified TCP incorporating a challenge probe, this time to distinguish between legitimate and illegitimate SYN messages. Once again, an example legitimate SYN exchange sequence 702 is contrasted with an example illegitimate SYN exchange sequence 704.

An established TCP connection may exist between the computer 202 and the computer 204, that is, the TCP connection may already be in a synchronized state. The legitimate SYN exchange sequence 702 may be initiated with a legitimate SYN message 706 from the computer 202 to the computer 204 informing the computer 204 that the computer 202 wishes to re-establish the TCP connection. If the sequence number 416 (FIG. 4) of the SYN message 706 is within a window (e.g., as specified by RFC 793) then, in response to the SYN message 706, the computer 204 may send a challenge probe 708 to the computer 202 to test the legitimacy of the SYN message 706. The challenge probe 708 may be an ACK message with acknowledgement number 418 equal to the next expected sequence number (rcv_nxt). When the computer 202 receives the challenge probe 708, if the acknowledgement number 418 of the challenge probe 708 does not correspond to the next sequence number to be sent (snd_nxt), it may respond, in compliance with RFC 793, with a RST message 710. The acknowledgement number 418 of the RST message 710 may be set to the sequence number 416 of the challenge probe 708 so that it will be classified as a good RST (GRST) by the computer 204 and the connection will be reset. Receipt of the RST message 710 at the computer 204 may be considered an indication that the SYN message 706 was legitimate.

The illegitimate SYN exchange sequence 704 may be initiated with an illegitimate SYN message 712 from the computer 206 to the computer 204. Once again, the computer 206 is a malicious node attempting an attack on the computer 204 and the fields of the SYN message 712 have been set so that the SYN message 712 appears to be a legitimate message 714 originating from the computer 202. As for the SYN message 706, the computer 204 responds to the SYN message 712 with a challenge probe 716. The challenge probe 716 may be an ACK message with acknowledgement number 418 equal to the next expected sequence number (rcv_nxt). Since, in this scenario, the computer 202 is not trying to re-establish the TCP connection between the computer 202 and the computer 204, the computer 202 may respond in accordance with RFC 793 for an established connection, that is, with an ACK message 718. Receipt of the ACK message 718 by the computer 204 may be considered an indication that the SYN message 712 was illegitimate.

In an embodiment of the invention, rather than challenging each, for example, RST and SYN message, it is more efficient to challenge some subset of RST and SYN messages. Some incoming protocol messages may be classified as suspicious or questionable and challenges limited to this class of protocol message.

Attempts to mimic legitimate protocol messages may be of varying quality. For example, the data packet 400 (FIG. 4) may include fields having values that match the tuple identifying the communication connection but also include further fields having values that, while formally compliant with the corresponding protocol specification (e.g., RFC 793), are out of the ordinary or questionable. Questionable values may include values that are statistically unlikely and/or beyond an expected value threshold as determined by a protocol model. Questionable values may further include values that fall outside of ranges determined according to a strict and/or rigorous interpretation of the corresponding protocol specification. A protocol message such as the RST message 612 (FIG. 6) or the SYN message 712 (FIG. 7) may be classified as questionable if one or more of its fields has questionable values.

Figure 8:
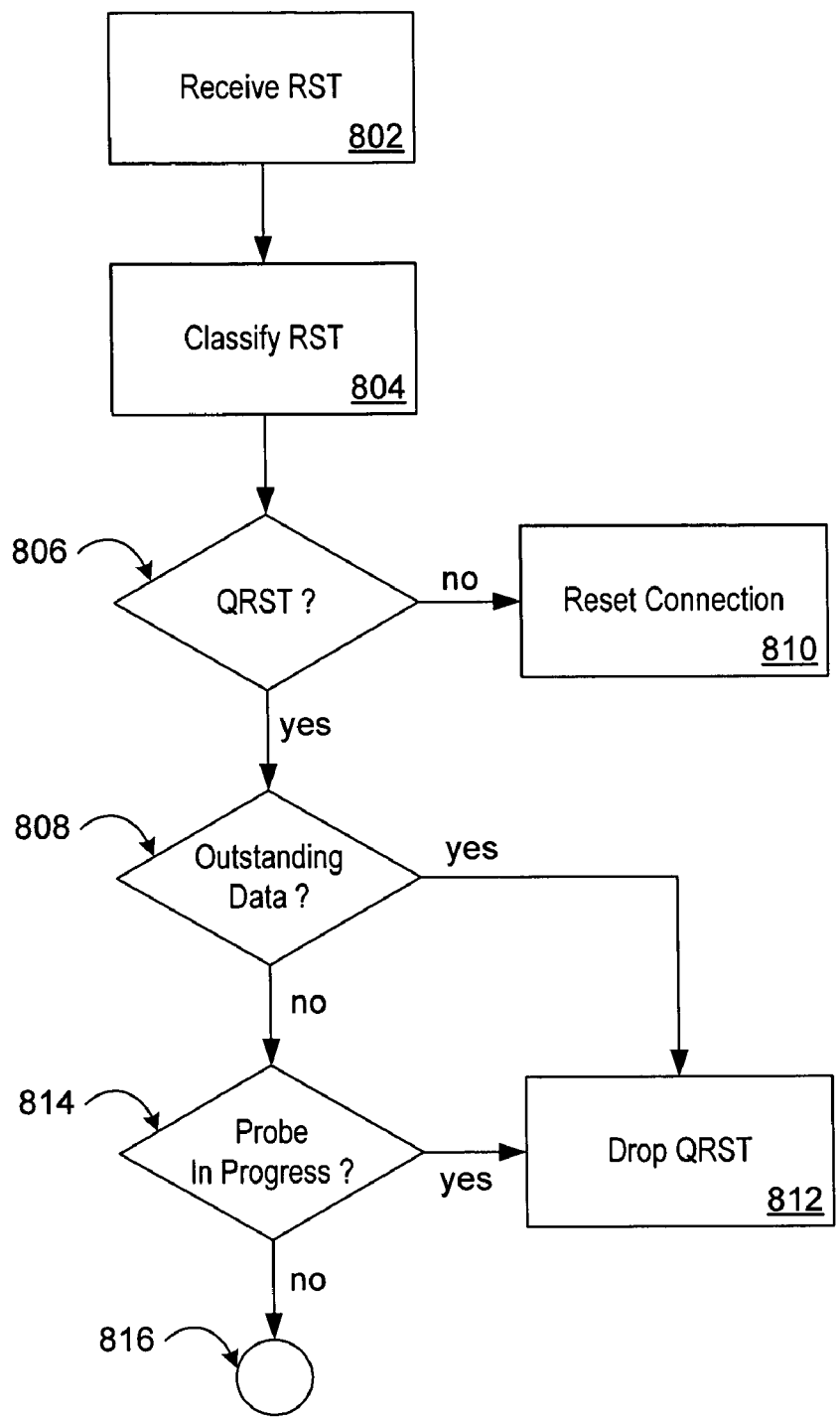
FIG. 8 is a flowchart depicting example steps for mitigating malicious network node activity with challenge probes in accordance with an embodiment of the invention.

Denial of service mitigation mechanisms in accordance with an embodiment of the invention may achieve additional efficiencies and robustness, for example, by limiting the number of challenge probes initiated in response to questionable protocol messages and/or judicious utilization of wait state timeouts while waiting for challenge probe responses. Such additions may be particularly effective when the denial of service mitigation mechanisms are required to cope with a wide variety of practical network environments. FIG. 8 depicts example steps for mitigating malicious network node activity with challenge probes in accordance with an embodiment of the invention. For clarity, the steps of FIG. 8 reference the RST message, however, as will be appreciated by one of skill in the art, embodiments of the invention may include steps referencing, for example, the SYN message or any suitable protocol message or suitable combination of protocol messages.

At step 802, an RST message such as the legitimate RST message 606 (FIG. 6) or the illegitimate RST message 612 may be received over a TCP connection. For example, the RST message may be received at the TCP layer 306 (FIG. 3) of the computer 204. At step 804, the RST message may be classified as a good RST (GRST) message or a questionable RST (QRST) message. For example, the denial of service attack mitigation module 308 may classify the RST message. RST message classification criteria may include whether the sequence number 416 (FIG. 4) matches the next expected sequence number (rcv_nxt) and whether the acknowledgement number 418 is in the range between the oldest unacknowledged sequence number (snd_una) and the highest sequence number sent (snd_max). For example, good RST messages may be RST messages with sequence numbers that do match the next expected sequence number and with acknowledgement numbers that are in the range between the oldest unacknowledged sequence number and the highest sequence number sent, and questionable RST messages may be RST messages that are not good RST messages.

At step 806 it may be determined whether the RST message is a questionable RST (QRST) message, for example, based upon the classification of step 804. If the RST message is a questionable RST message, the procedure may progress to step 808, otherwise the procedure may progress to step 810. At step 810, the TCP connection over which the RST message was received may be reset, for example, as specified by RFC 793 in response to receipt of an RST message.

At step 808, it may be determined whether there is outstanding data to be sent over the TCP connection. If there is outstanding data to be sent over the TCP connection, the procedure may progress to step 812. Otherwise, the procedure may progress to step 814. At step 812, the RST message may be dropped and not further processed.

Figure 9:
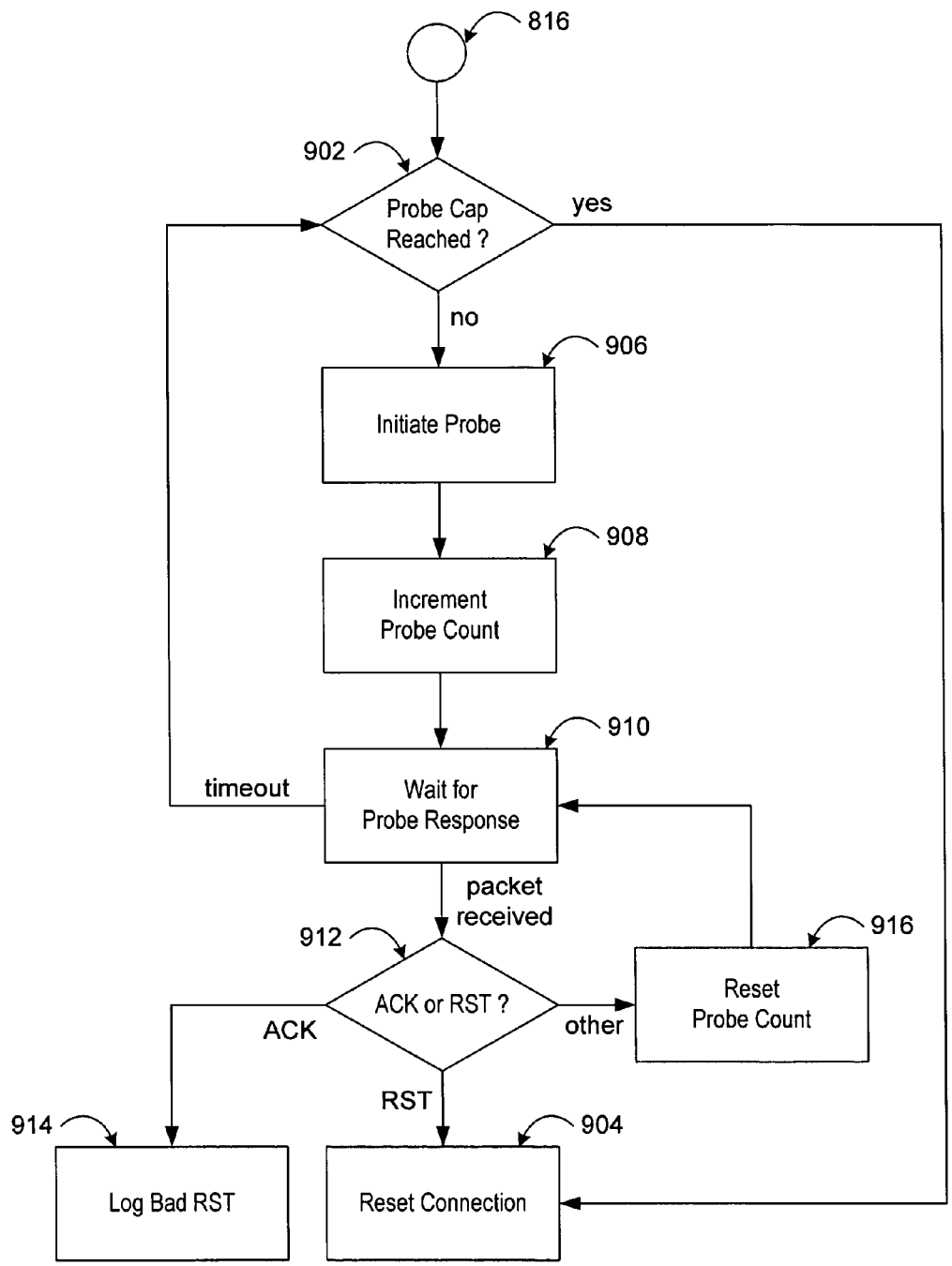
FIG. 9 is a flowchart depicting further example steps for mitigating malicious network node activity with challenge probes in accordance with an embodiment of the invention.

At step 814, it may be determined if there is a challenge probe currently in progress. For example, the denial of service attack mitigation module 308 may keep track of initiated challenge probes in a list, table or other suitable data structure. If there is a challenge probe currently in progress, the procedure may progress to step 812. Otherwise, the procedure may progress to step 902 of FIG. 9. FIG. 9 depicts further example steps for mitigating malicious network node activity with a challenge probe in accordance with an embodiment of the invention. Diagram connector 816 indicates that the steps of FIG. 8 and the steps of FIG. 9 may be connected.

At step 902, it may be determined if a probe cap has been reached. For example, the denial of service mitigation module 308 may maintain a probe count variable for the connection and also be configured with a probe count limit threshold (e.g., a probe count limit of 5). If the probe count variable has a value that equals or exceeds the probe count limit threshold then the denial of service mitigation module 308 may determine that the probe cap has been reached. If the probe cap has been reached, the procedure may progress to step 904. Otherwise, the procedure may progress to step 906. At step 904, as for step 810 (FIG. 8), the TCP connection may be reset.

At step 906, a challenge probe may be initiated, for example, the challenge probe 608 (FIG. 6) or the challenge probe 616. The challenge probe may be an ACK message with sequence number 416 (FIG. 4) and acknowledgement number 418 corresponding to the next sequence number to be sent (snd_nxt) and the next expected sequence number (rcv_nxt). At step 908, the probe count variable may be incremented.

At step 910, a thread of execution, for example, may wait for a response to the challenge probe initiated in step 906. When a data packet (e.g., the data packet 400 of FIG. 4) is received over the connection, the waiting step 910 may end and the procedure progress to step 912. A wait timeout may occur (e.g., after 5 minutes) before a data packet is received over the connection. If a timeout occurs, the procedure may return to step 902. For robustness, the wait timeout may be implemented in accordance with a conventional TCP KeepAlive timer.

At step 912, the data packet that terminated the waiting step 912 may be examined and the nature of the data packet determined, for example, in accordance with RFC 793. If the data packet is determined to be an ACK message such as the ACK message 618 (FIG. 6) sent in response to the challenge probe 616 then the procedure may progress to step 914. If the data packet is determined to be an RST message such as the RST message 610 sent in response to the challenge probe 608 then the procedure may progress to step 904. Otherwise, the procedure may progress to step 916. In each case the data packet may be handled in accordance with RFC 793.

At step 916, the value of the probe count variable may be reset to zero. In an embodiment of the invention, a purpose of the probe count variable and the probe count limit threshold is to prevent a lengthy protocol loop in which responses to challenge probes trigger additional challenge probes. The probe count may be reset to zero if data packets other than responses to challenge probes are being received over the connection since such receipts may indicate that it is unlikely that the undesirable protocol loop is occurring. Having reset the probe count, the procedure may progress to step 910 to further wait for the response to the challenge probe.

At step 914, a bad (i.e., illegitimate) RST message may have been detected. The bad RST message may be logged for later analysis. Alternatively, the bad RST message may simply be dropped and not further processed.

The SYN message 504 (FIG. 5) and the RST message 524 are examples of TCP control messages. For non-control messages such as the DATA message 512, the utilization of a challenge probe may be inappropriate, for example, because adding the challenge probe overhead to a high volume message type may result in unacceptable protocol performance degradation. In an embodiment of the invention, questionable protocol messages may be ignored or dropped independent of a challenge probe. However, care may be required when classifying such protocol messages as questionable to avoid dropping legitimate protocol messages, for example, conservative field value thresholds may be determined and/or configured.

Figure 10:
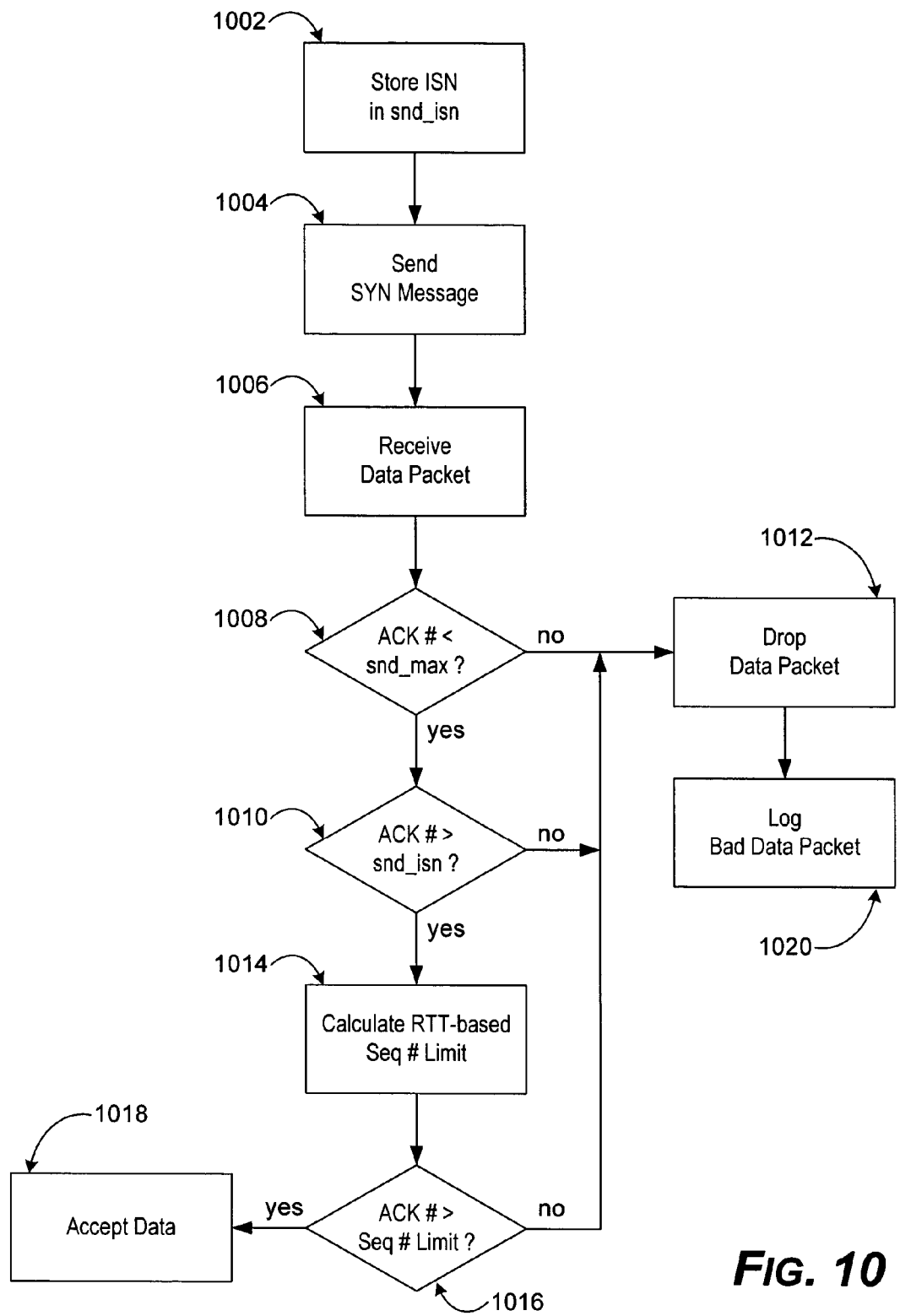
FIG. 10 is a flowchart depicting example steps for mitigating malicious network node activity with acknowledgement number validation in accordance with an embodiment of the invention.

FIG. 10 depicts example steps for mitigating malicious network node activity with acknowledgement number validation in accordance with an embodiment of the invention. For example, the steps of FIG. 10 may be utilized to mitigate a denial of service attack including illegitimate DATA messages. Each party to the TCP connection may generate an initial sequence number (ISN) for utilization as a base when determining values for the sequence number 416 (FIG. 4) field of the data packet 400. At step 1002, the initial sequence number may be stored in a new field (snd_isn) of a conventional TCP transmission control block (TCB) for the connection. For example, the transmission control block may be maintained by the TCP layer 306 (FIG. 3). At step 1004, in accordance with RFC 793, the initial sequence number may be sent in a SYN message such as the SYN message 504 (FIG. 5) in order to establish the connection.

At step 1006, a data packet such as the data packet 400 (FIG. 4) may be received. For example, a DATA message such as the DATA message 512 (FIG. 5) may be received by the sender of the step 1004 SYN message. At step 1008, the acknowledgement number 418 of the received data packet 400 may compared to the highest sent sequence number (snd_max). If the acknowledgement number 410 is less than the highest sent sequence number then the procedure may progress to step 1010. Otherwise, the data packet 400 may be determined to be illegitimate and the procedure may progress to step 1012. As will be appreciated by one of skill in the art, sequence number and acknowledgement number calculations and comparisons may be implemented utilizing modulo arithmetic to accommodate fixed size sequence number 416 and acknowledgement number 418 fields. As a result, terms such as "greater than" and "less than" may be read as "greater than in accordance with modulo arithmetic" and "less than in accordance with modulo arithmetic" and the like.

At step 1010, the acknowledgement number 418 (FIG. 4) of the received data packet 400 may be compared to the stored initial sequence number (snd_isn). If the acknowledgment number 410 is greater than the stored initial sequence number then the procedure may progress to step 1014. Otherwise, the data packet 400 may be determined to be illegitimate and the procedure may progress to step 1012.

The highest sent sequence number and the stored initial sequence number may be an upper and a lower limit, respectively, of a range of legitimate acknowledgement numbers. In an embodiment of the invention, the legitimate range is narrowed by raising the lower limit. The lower limit may be raised by taking into account an amount of data that may be transmitted within a connection round trip time (RTT), for example, an average duration between a time that the DATA message 512 (FIG. 5) is sent and a time that its corresponding DATA ACK message 514 is received. In an embodiment of the invention, the amount of data that may be transmitted within the round trip time is limited, for example, to a size of a receive window (max_wnd). As a result, the lower limit may be set so that the difference between the highest sent sequence number and the lower limit is not more than the amount of data that may be transmitted within a multiple of the round trip time.

At step 1014, the RTT-based sequence number limit may be calculated, for example, as a function (e.g., a linear function) of the receive window size. Example steps for calculating the RTT-based sequence number limit are described below in more detail with reference to FIG. 11. At step 1016, the acknowledgement number 418 (FIG. 4) of the received data packet 400 may be compared to the RTT-based sequence number limit. If the acknowledgement number 418 is greater than the RTT-based sequence number limit then the procedure may progress to step 1018. Otherwise, the data packet 400 may be determined to be illegitimate and the procedure may progress to step 1012.

At step 1018, the data 422 (FIG. 4) of the data packet 400 may be accepted as legitimate and further processed. At step 1012, the data packet 400 may be determined to be illegitimate and thus dropped and/or ignored. The illegitimate or bad data packet, and/or the fact of its occurrence, may be logged at step 1020.

Figure 11:
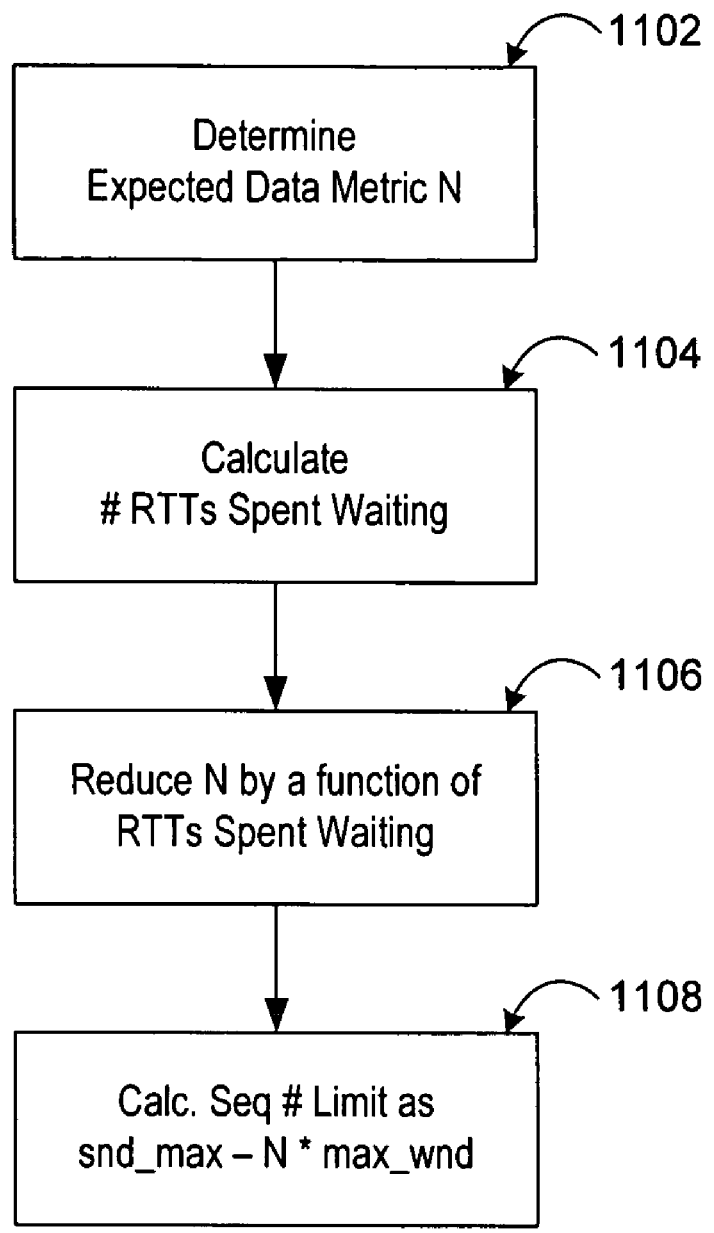
FIG. 11 is a flowchart depicting example steps for calculating a round trip time (RTT) based sequence number limit in accordance with an embodiment of the invention.

FIG. 11 depicts example steps for calculating the RTT-based sequence number limit in accordance with an embodiment of the invention. At step 1102, an expected data metric N may be determined. For example, the expected data metric N may be a function (e.g., a linear function) of the number of unacknowledged bytes sent. Although the expected data metric N may be effective without further modification, in an embodiment of the invention, the expected data metric N may be further optimized as a function (e.g., a linear function) of elapsed multiples of protocol message round trip time (RTT).

A duration spent waiting for expected data may be available, for example, from the TCP layer 306 (FIG. 3), and/or may be calculated as a difference between a current time and a time that expected data was last received (e.g., as indicated by a timestamp). At step 1104, the duration spent waiting for expected data may be calculated as a multiple of the round trip time (RTT). For example, the duration spent waiting for expected data in seconds may be divided by the round trip time (RTT) in seconds and the result rounded. At step 1106, the expected data metric N may be reduced by a function (e.g., a linear function) of the multiple of the round trip time (RTT) spent waiting for expected data as calculated in step 1104.

At step 1108, the RTT-based sequence number limit may be calculated as the highest sent sequence number (snd_max) less the receive window size (max_wnd) multiplied by the expected data metric N, that is, using symbols: snd_max-N*max_wnd. For example, the receive window size may be the maximum receive window size advertised by the network node to which the unacknowledged bytes were sent. With time, the reduction of the expected data metric N at step 1106 may result in the RTT-based sequence number limit becoming close to the highest sent sequence number (snd_max). The difference between the RTT-based sequence number limit and the highest sent sequence number (snd_max) may be limited to a minimum (e.g., 1 byte). As depicted at step 1016

(FIG. 10), the RTT-based sequence number limit may be utilized to validate the acknowledgement number 418 (FIG. 4) of the data packet 400.

As described above, part of mimicking legitimate TCP/IP messages may include filling fields of the data packet 400 (FIG. 4) with values corresponding to existing connections. In particular, mimicking legitimate TCP/IP messages may include choosing tuple values corresponding to at least one of the existing connections. Some such tuple values may be easy for an attacker to choose. For example, if the denial of service attack is targeting a well known web server, then the destination IP address 410 and the destination port 414 may be publicly advertised. In an embodiment of the invention, mimicking legitimate TCP/IP messages is made more difficult by making it more difficult to choose the source port 412 value of the tuple.

Conventionally, the source port 412 value for a new connection is typically the next sequentially available port number, beginning with a well known initial source port number (e.g., 1025). This conventional source port 412 value selection procedure may be relatively easy for an attacker to predict and thus mimic. In an embodiment of the invention, the source port 412 value selection procedure is modified to be less predictable. The initial source port number of a sequence may be selected at random from a range of available source port numbers (e.g., 1025 to 65535). Each source port 412 value may be selected at random from the range of available source port numbers. The selection at random may be implemented with a conventional pseudo-random number generator. The selection at random may be configured to maximize an interval between port number reuse.

Figure 12:
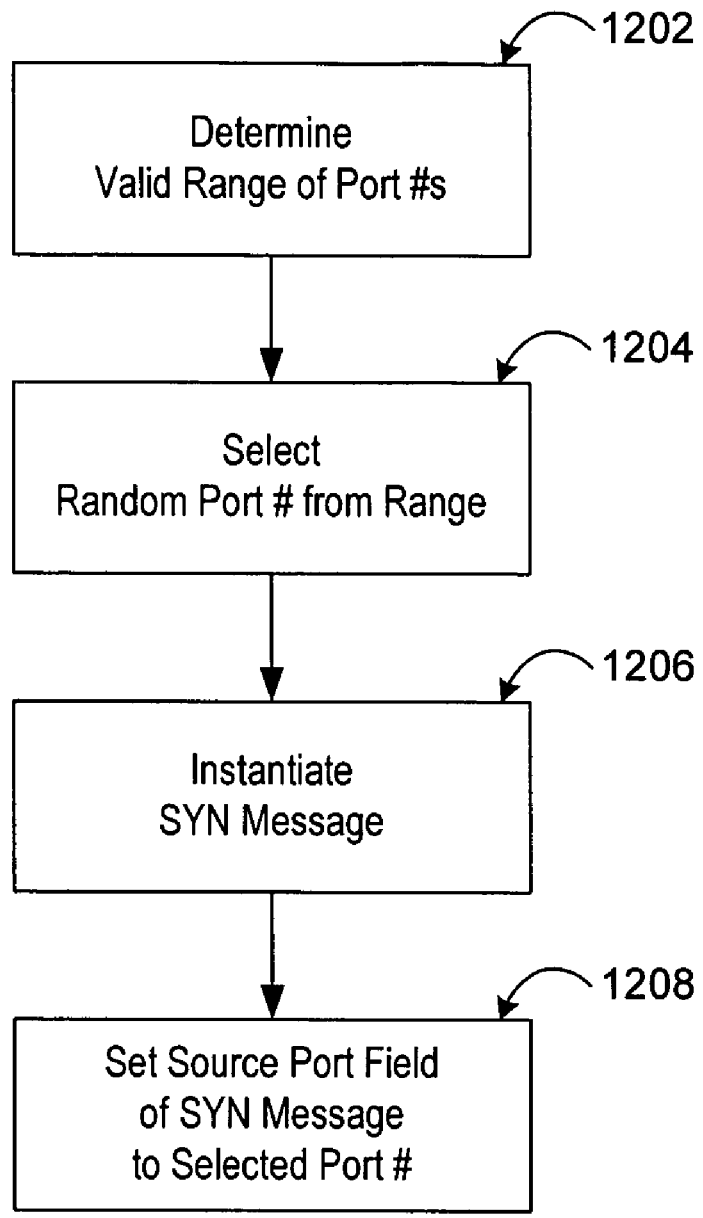
FIG. 12 is a flowchart depicting example steps for mitigating malicious network node activity with randomized source port selection in accordance with an embodiment of the invention.

FIG. 12 depicts example steps for mitigating malicious network node activity with randomized source port selection in accordance with an embodiment of the invention. At step 1202, a valid range of source port numbers may be determined. For example, the denial of service attack mitigation module 308 (FIG. 3) may request the range of available source port numbers from the TCP layer 306. At step 1204, a source port number may be randomly selected from the range of source port numbers determined in step 1202. For example, the denial of service attack mitigation module 308 may execute the selection at random.

At step 1206, a SYN message such as the SYN message 504 (FIG. 5) may be instantiated. For example, the SYN message may be instantiated by the TCP layer 306 (FIG. 3). At step 1208, the value of the source port 412 (FIG. 4) field of the SYN message 504 may be set to source port number selected in step 1204.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-readable storage medium having thereon computer-executable instructions for implementing, when executed on a computer, a method of mitigating malicious network node activity, the method comprising:

receiving a protocol message of a transmission control protocol (TCP) over a transmission control protocol TCP connection;

determining that the protocol message is a questionable protocol message, wherein the questionable protocol message includes a sequence number that does not match a next expected sequence number and an acknowledgment number that is outside of a range between an oldest unacknowledged sequence number and a highest sequence number sent; and when it is determined that the protocol message is the questionable protocol message and a limit on an allowed number of challenge probes sent is not reached, wherein the limit is reached when a probe count variable equals or exceeds the limit:

sending a challenge probe;

incrementing the probe count variable;

receiving a response to the challenge probe, the response comprising at least one data field, the at least one data field having at least one value; and determining that the protocol message is an illegitimate protocol message as a function of at least the at least one value of the at least one data field of the response.

2. The computer-readable storage medium of claim 1, wherein the method further comprises setting a challenge probe cap as the allowed number of the challenge probes sent.

3. The computer-readable storage medium of claim 2, wherein the method further comprises resetting the TCP connection when the challenge probe cap is reached.

4. The computer-readable storage medium of claim 1, wherein the method further comprises:

receiving a further protocol message;

determining that the further protocol message is a further questionable protocol message; and dropping the further questionable protocol message if the response to the challenge probe has not yet been received.

5. The computer-readable storage medium of claim 1, wherein the method further comprises dropping the questionable protocol message if there is outstanding data to be sent.

6. The computer-readable storage medium of claim 1, wherein the challenge probe is an acknowledgement (ACK) message of the transmission control protocol.

7. The computer-readable storage medium of claim 1, wherein the protocol message is a reset (RST) message of the transmission control protocol.

8. The computer-readable storage medium of claim 7, wherein the challenge probe is an acknowledgement (ACK) message of the transmission control protocol; and determining that the reset message is an illegitimate reset message comprises determining that the response to the challenge probe is another acknowledgement message of the transmission control protocol.

9. The computer-readable storage medium of claim 1, wherein the protocol message is a synchronize (SYN) message of the transmission control protocol.

10. The computer-readable storage medium of claim 9, wherein:
the challenge probe is an acknowledgement (ACK) message of the transmission control protocol; and
determining that the synchronize message is an illegitimate synchronize message comprises determining that the response to the challenge probe is another acknowledgement message of the transmission control protocol.

11. The computer-readable storage medium of claim 1, wherein determining that the protocol message is a questionable protocol message comprises determining that at least one value of the at least one field of the protocol message lies outside of an expected range of values.

* * * * *